United States Patent Office 3,377,204
Patented Apr. 9, 1968

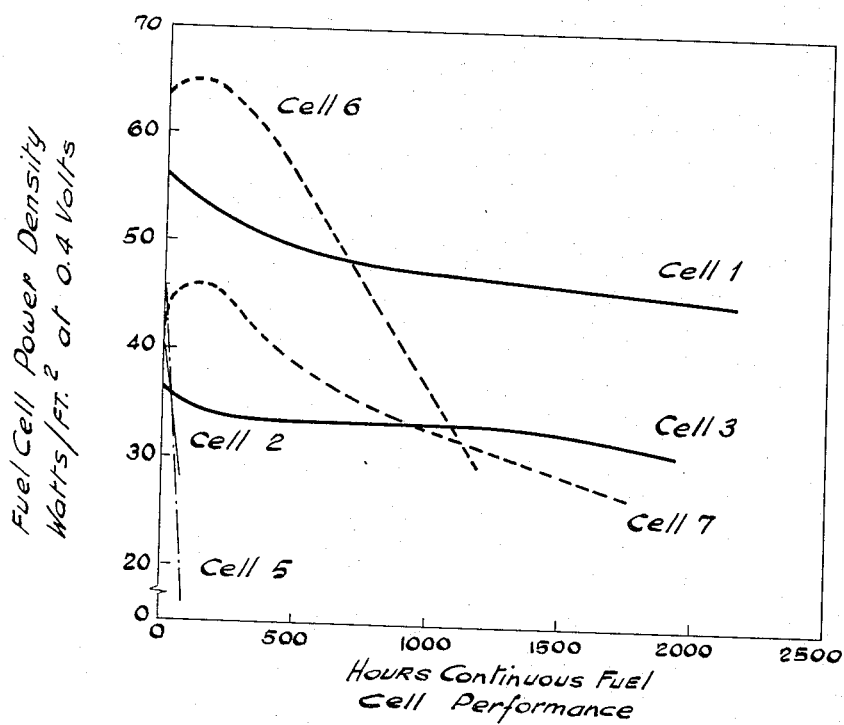

3,377,204
METHOD OF INCORPORATING PLATINUM IN CARBON
William B. Mather, Jr., and Robert M. Suggitt, Fishkill, N.Y., assignors to Texaco Inc., New York, N.Y., a corporation of Delaware
Filed Dec. 21, 1964, Ser. No. 419,802
1 Claim. (Cl. 136—122)

ABSTRACT OF THE DISCLOSURE

A platinum-coated, porous carbon, fuel cell electrode having improved long term performance characteristics is prepared by subjecting the platinum surface of the electrode to a reducing atmosphere at between 700 and 1000° C. for 1 to 10 hours following the formation of the elemental layer of platinum on the carbon surface.

---

This invention relates to a porous carbon fuel cell electrode which exhibits high performance and long term characteristics when used in a fuel cell employing an acidic electrolyte and to the method for preparing the electrode.

Electrodes prepared pursuant to the method disclosed herein are particularly useful in fuel cells of a type and employing an electrolyte of a type disclosed in a copending application, assigned to the assignee herein, Ser. No. 311,415, entitled, "Intermediate Temperature Fuel Cell and Electrolyte," filed by William B. Mather, Jr., on Sept. 25, 1963.

A fuel cell is a device capable of generating electrical energy directly from chemical energy by means of the oxidation of a fuel by an oxidizing agent. This energy conversion is accomplished without the heat energy cycle required by most electrical generating systems and results in a generation efficiency in the order of 70% as against 40% experienced in the conventional generating systems employing a heat energy or Carnot cycle. Although of limited commercial use at present, fuel cells have been the subject of extensive research because of their potential usefulness. A typical cell has two electrodes immersed in and separated by an electrolyte, fuel gas, such as hydrogen or gaseous saturated aliphatic hydrocarbons, supplied to one electrode, the anode, and oxygen or an oxidizing gas supplied to the other electrode, the cathode. The fuel is electrochemically oxidized at the anode producing electrons which are picked up by the anode, passed through an external electrical connection, where useful electrical work can be performed, to the cathode where they reduce the oxygen which, in the case of an acidic electrolyte, combines with protons, formed at the anode and moved within the electrolyte to the cathode, to form water.

Either acidic or alkaline electrolytes are utilized in fuel cells—operating temperature, corrosion rates, and materials of construction usually dictating the electrolyte. Although the mechanism of electron transfer differs with the type of electrolyte the overall reactions are the same. With an acidic electrolyte, hydrogen ions move within the electrolyte from the anode to the cathode. The reactions are:

Anode: $2H_2 \rightarrow 4H^+ + 4e^-$
Cathode: $4H^+ + O_2 + 4e^- \rightarrow 2H_2O$
Overall: $2H_2 + O_2 \rightarrow 2H_2O$ In the case of a cell using an alkaline electrolyte, hydroxyl ions move within the electrolyte from the cathode to the anode. The reactions are:

Anode: $2H_2 + 4OH^- \rightarrow 4H_2O + 4e^-$
Cathode: $O_2 + 2H_2O + 4e^- \rightarrow 4OH^-$
Overall: $2H_2 + O_2 \rightarrow 2H_2O$ An acidic electrolyte is more desirable when using hydrocarbon fuels since one of the reaction products, $CO_2$, would react with an alkaline electrolyte. Although an acid electrolyte is not as efficient electrically as a strongly alkaline medium, creepage and associated problems encountered with strongly alkaline materials make the acidic system attractive. The electrolyte may be used in any of several forms, the most common being aqueous solutions, fused salts, metal carbonates or oxide in liquid, semiliquid or solid forms, pastes and gels.

The two electrodes in the fuel cell perform several functions and should possess certain properties. They separate the electrolyte from both the fuel and the oxygen while providing the surface for the propagation of the chemical reactions and the collection and dissemination of the electrical energy being produced. Electrodes having high electrical conductivity, suitable porosity and long service life are preferable. In addition, it may be desirable that the electrode may be used as either the cathode or the anode. The electrode surface should, ideally, consist of a catalytic material to promote the basic fuel cell reactions, i.e., the oxidation of the fuel at the anode and the reduction of the oxygen at the cathode, and to promote the production of water at the cathode rather than hydrogen peroxide. For proper fuel cell operation, there must be a triple interface at each electrode, namely, fuel or oxygen, electrode and electrolyte. To provide the proper electrode surface, two types of electrodes are most commonly used—porous carbon electrodes whose surfaces are metal coated and porous metal electrodes. The porosity of the electrodes is critical—the diameter of the pores facing the gas phase (fuel or oxygen) must be large enough to allow a proper interchange of gas while the diameter of the pores facing the electrolyte must be small enough to prevent the electrolyte from "flooding" the electrode. It is therefore preferable that the pore diameter be greater on the gas side of the electrode than on the electrolyte side. Satisfactory fuel cell performance has been obtained with electrodes whose pores are tapered or with so-called "bi-porous" electrodes.

Fuel cells may be broadly classified by their operating temperatures. High temperature fuel cells operate at about 600° C. or above utilizing solid or molten electrolytes. While these fuel cells have the advantage of utilizing inexpensive electrodes, they possess many disadvantages, viz., high cell resistance, slow start-up time, inefficient use of fuel and corrosion problems. Low temperature fuel cells operate with aqueous electrolytic solutions at ambient temperature. Although the low temperature offers obvious advantages, the aqueous electrolytes are easily poisoned by fuel and oxidizer impurities such as carbon dioxide, carbon monoxide and light olefins. The aqueous electrolytes also present the problem of flooding when porous electrodes are used. The third type of fuel cell, the intermediate temperature fuel cell, operates in the range of 100° to 300° C. Aqueous electrolytes can be used in these cells but have the disadvantage of electrode flooding and require operating pressures in the order of 600 p.s.i.g. to maintain the water content at a suitable level.

With the increased interest in the commercial exploitation of fuel cells, units possessing a long service life and requiring a minimum of attention and maintenance are becoming increasingly important. Component development and improvement are required to obtain this goal. Electrolytes of improved quality, stability and performance are being developed, viz., the gelled borophosphoric acid-phosphoric acid electrolyte disclosed in the patent application referred to above.

The object of our invention is to prepare electrodes with superior performance characteristics for use in fuel cells. Another objective is to prepare electrodes for stable long term operation when used in fuel cells. A further object is to prepare electrodes that will exhibit high performance characteristics and long term stability when used in fuel cells utilizing an acidic electrolyte.

We have found that these objectives can be attained by preparing the electrodes in a special manner. The method of preparing the porous carbon electrodes of our invention is: (a) heating the carbon electrode in a carbon dioxide atmosphere at a temperature between 700 and 1000° C. for one to ten hours, (b) incorporation of a catalytic material on the electrode surface by coating the carbon surface with chloroplatinic acid, (c) reducing the chloroplatinic acid on the surface of the electrode to elemental platinum by heating in a hydrogen atmosphere at a temperature between 200 and 300° C. for one to four hours, and (d) treating the electrode in a hydrogen atmosphere at a temperature of at least 700° C. for at least one hours, or at a temperature between 700 and 1000° C. for one to ten hours. Briefly, the preferred method of preparing the porous carbon electrodes involves:

(a) Oxidation of the porous carbon electrodes by $CO_2$ at 850° C. for 2½ hours (this subject matter is disclosed and claimed in a later filed application owned by the assignee herein, application Ser. No. 428,253 filed Jan. 26, 1965), (b) Incorporation of a catalytic material on the electrode surface by brushing an ethanol solution of chloroplatinic acid on the heated carbon surface and reducing the acid to metallic platinum with flowing $H_2$ at 225° C. for three hours, and (c) Treatment of the electrode surface by heating in a hydrogen atmosphere at 800° C. for one hour followed by cooling to room temperature in a hydrogen atmosphere.

The precise scientific theory which explains the improved results obtained by the method of the invention is not known. Without limiting our invention, it is thought to be that the high temperature hydrogen treatment removes the surface oxides thereby reducing the wetting of the surface by the acidic electrolyte, a polar liquid, and keeps more platinum electro-catalyst sites available for chemical reaction. The availability of more sites for catalytic reaction may explain the improved cell performance.

EXAMPLE I

This example illustrates the method of preparing the porous carbon fuel cell electrodes of the invention.

Two porous carbon electrodes having the following properties were treated:

Dimensions ------------------ 2" x 2" square, ⅛ thick.
Density ---------------------- 1.35 g./cc.
Porosity --------------------- 0.331 cc./g.
Pore diameter ---------------- 0.08 to 10 microns.

The electrodes were impregnated with an aqueous solution of $FeCl_3$, heated in an atmosphere of carbon dioxide in an Inconel container at 850° C. for 2½–3 hours. This treatment apparently increases the porosity of the electrodes and preferentially enlarges the pores at the electrode surface providing tapered pores to control electrolyte flooding.

After boiling in dilute HCl, rinsing with water and drying with heated air, platinum catalyst was applied in an amount of 7.5 mg./cm.$^2$ of electrode to the surface of the electrode which would be exposed to the acid electrolyte. A 0.38 molar solution of chloroplatinic acid ($H_2PtCl_6 \cdot 6H_2O$) in ethanol was brushed or dripped onto the heated carbon surface at such a rate that the alcohol rapidly evaporated. The electrodes were then treated with hydrogen at 225° C. for 3 hours to reduce the chloroplatinic acid to metallic platinum.

The final treatment step and the subject of this invention consisted of heating the electrodes in a stream of hydrogen at 800° C. for one hour and cooling the electrodes to ambient temperature in a hydrogen atmosphere.

EXAMPLE II

This example illustrates the high performance characteristics obtained from a fuel cell utilizing the electrodes of this invention.

A fuel cell, designated Cell 1, was assembled using two porous carbon electrodes prepared as described in Example I. The acid electrolyte consisted of a gel composed of 2 parts of borophosphoric acid and 5 parts of phosphoric acid. The cell was heated to 200° C., $H_2$ was introduced into the fuel chamber of the cell and $O_2$ into the oxidizer chamber. Another cell, designated Cell 2, was assembled and operated under the same conditions. It was the same in all respects to Cell 1 except that the treatment of the electrodes did not include the final heating to 800° C. in the presence of hydrogen. The following characteristics were observed.

|  | Power Density, watts/ft.$^2$ at 0.4 v. | Open Circuit Voltage, volts |
|---|---|---|
| Cell 1 | 54 | 0.95 |
| Cell 2 | 41 | 0.85 |

Cells 3 and 4 were operated and observed under the same conditions. Again the cell construction, the acidic electrolyte and electrodes were the same as in the case of Cell 1 except for the following:

Cell 3 electrodes

Carbon dioxide treatment.—Electrodes were impregnated with aqueous solution of $FeCl_3$, heated in a $CO_2$ atmosphere at 900° C. for three hours in a Vycor tube. Electrodes were then boiled in dilute HCl, rinsed in $H_2O$ and air dried.

Final high temperature hydrogen treatment.—Electrodes were heated in a stream of hydrogen at 800° C. for one hour and then cooled to ambient temperature in hydrogen.

Cell 4 electrodes

Carbon dioxide treatment.—Electrodes received same treatment as Cell 3 electrodes.

Final high temperature hydrogen treatment.—Electrodes did not receive this treatment.

The following characteristics were observed:

|  | Power Density, watts/ft.$^2$ at 0.4 v. | Open Circuit Voltage, volts |
|---|---|---|
| Cell 3 | 35 | 0.99 |
| Cell 4 | 30 | 0.94 |

EXAMPLE III

This example illustrates the superior long term operating characteristics obtained from a fuel cell utilizing the electrodes of this invention. The characteristics of six cells were observed during extended operations. In addition to Cells 1, 2 and 3 referred to in the above examples, this study included Cells 5, 6 and 7. The outstanding features of Cells 1, 2 and 3 and the preparation of their respective electrodes are set forth in Examples I and II above. Briefly, the electrodes in Cells 1 and 3 utilized electrodes whose preparation included the high temperature hydrogen treatment as taught by this invention. The electrodes in Cell 2 did not receive this treatment. Other differences in electrode preparation are set forth in the above examples.

Cells 5, 6 and 7 were operated under the same conditions as Cell 1 and were in all respects the same as Cell 1 except for the following differences in electrode preparation:

Cell 5 electrodes

Carbon dioxide treatment.—Electrodes received same treatment as Cell 1 electrodes except that the acid rinse and drying steps prior to catalyst deposition on the electrodes were not used.

High temperature hydrogen treatment.—Electrodes did not receive this treatment.

Cell 6 electrodes

Carbon dioxide treatment.—Electrodes did not receive the FeCl₃ solution impregnation. Electrodes were heated in a $CO_2$ atmosphere at 950° C. for four hours in a stainless steel container.

High temperature hydrogen treatment.—Electrodes did not receive this treatment.

Cell 7 electrodes

Carbon dioxide treatment.—Electrodes did not receive the FeCl₃ solution impregnation. Electrodes were heated in a $CO_2$ atmosphere at 750° C. for one hour in a stainless steel container.

High temperature hydrogen treatment.—Electrodes did not receive this treatment.

The long term operating characteristics of Cells 1, 2, 3, 5, 6 and 7 were observed as set forth in the following graph. It will be noted that Cells 1 and 3 exhibited superior long term performance, i.e., they possessed high power densities which remained stable with only a small decline in value during an operation of approximately 2000 hours. Both of these cells utilized electrodes whose preparation included the high temperature hydrogen treatment taught by this invention. The other four cells whose electrode preparation did not include this hydrogen treatment step did not demonstrate long term stable operation. The power density of Cells 2 and 5 fell over so rapidly as to be inoperable before 100 hours had elapsed. Although Cells 6 and 7 demonstrated high power densities during initial operation, the values declined at a more rapid rate than did those of Cells 1 and 3.

We claim:
1. A method of preparing a porous carbon electrode for use in a fuel cell which comprises:
   (a) heating the electrode in a carbon dioxide atmosphere at a temperature between 700° and 1000° C. for 1 to 10 hours,
   (b) coating the carbon surface with chloroplatinic acid,
   (c) reducing the chloroplatinic acid on the surface of the electrode to elemental platinum by heating in a hydrogen atmosphere at a temperature between 200° and 300° C. for 1 to 4 hours, and
   (d) treating the electrode in a hydrogen atmosphere by heating at a temperature between 700° and 1000° C. for 1 to 10 hours and cooling to room temperature.

References Cited

UNITED STATES PATENTS

| | | | |
|---|---|---|---|
| 2,669,598 | 2/1954 | Marko et al. | 136—120 |
| 3,116,169 | 12/1963 | Thompson | 136—120 |
| 3,212,930 | 10/1965 | Thompson et al. | 136—120 |
| 3,196,050 | 7/1965 | Thompson | 136—122 |

ALLEN B. CURTIS, *Primary Examiner.*

WINSTON A. DOUGLAS, *Examiner.*

A. SKAPARS, *Assistant Examiner.*